May 6, 1941.  C. D. YOUNG  2,241,233
RECORDING OR INDICATING INSTRUMENT
Original Filed April 21, 1938  2 Sheets-Sheet 1
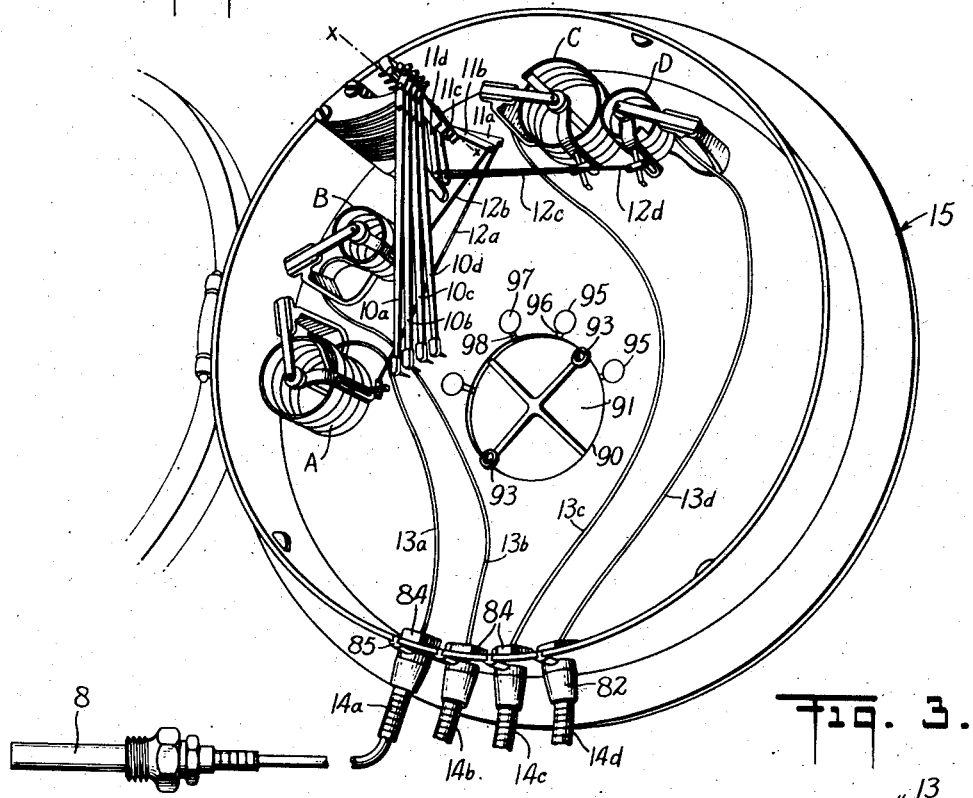
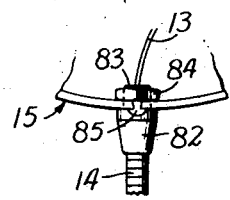
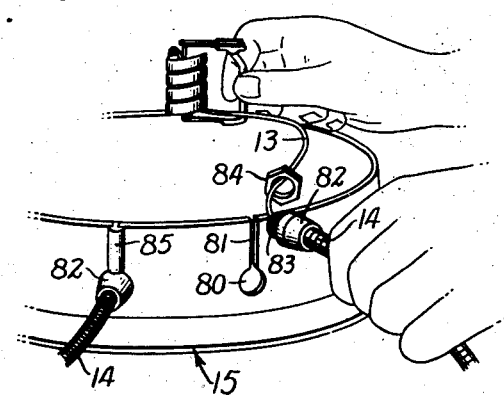
INVENTOR
Claude D. Young
BY
Blair, Curtis, Dunne + Hayward
ATTORNEYS May 6, 1941. C. D. YOUNG 2,241,233
RECORDING OR INDICATING INSTRUMENT
Original Filed April 21, 1938 2 Sheets-Sheet 2
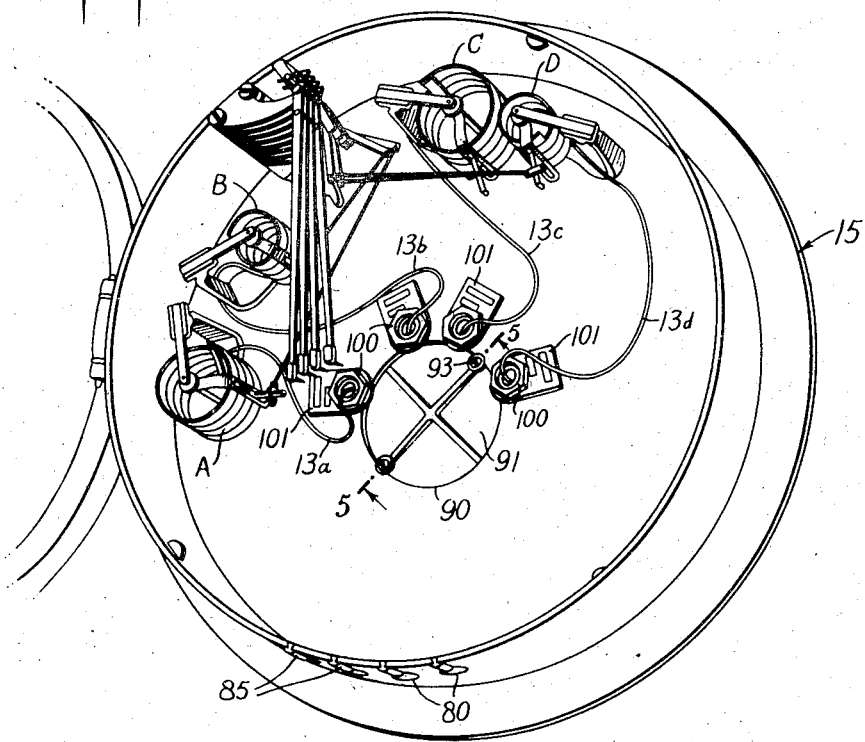
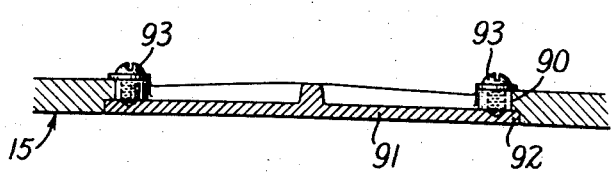
INVENTOR
Claude D. Young
BY
Blair, Curtis, Dunne + Hayward
ATTORNEYS Patented May 6, 1941

2,241,233

UNITED STATES PATENT OFFICE 2,241,233

RECORDING OR INDICATING INSTRUMENT

Claude D. Young, Foxboro, Mass., assignor to The Foxboro Company, Foxboro, Mass., a corporation of Massachusetts Original application April 21, 1938, Serial No. 203,302. Divided and this application January 25, 1939, Serial No. 252,753

6 Claims. (Cl. 73—151)

The invention herein described pertains to improvements in instruments for indicating, recording and/or controlling variable conditions; this application being a divisional of my co-pending application Serial No. 203,302, filed April 21, 1938.

In the embodiments chosen to illustrate said invention several pressure responsive elements are provided in a single instrument casing for recording on a single chart the values being measured by several temperature responsive elements. The temperature responsive elements commonly used for this purpose each comprises a thermometer bulb filled with mercury or other fluid which varies in a characteristic with change of temperature. The thermometer bulb is located at a place whose temperature is to be measured and is connected by a small bore or capillary tubing with a spiral tube or other flexible element one end of which is free to move in response to pressure variations in the tubing caused by changes of temperature in the bulb. This latter element is mounted in the casing and its free end is connected through suitable linkage mechanism with a pen moving over the chart on which the record is recorded. Usually the bulb, tubing and element are filled and sealed with whatever fluid is used and calibrated as a responsive unit.

It is an object of the present invention to provide an improved casing or housing into which the responsive units or any of them may be inserted and from which they may be removed in part or as a unit without disturbing other units which may be mounted in the same casing.

Other objects will be in part obvious and in part pointed out hereinafter.

In the drawings wherein are illustrated several embodiments of the invention:

Figure 1 is a perspective view of a multiple pen recorder housed in a standardized instrument case connected for surface mounting;

Figure 2 is a part perspective view illustrating the manner in which a measuring unit or responsive unit may be removed from or assembled with the instrument case;

Figure 3 is a detail illustrating the preferred mode of connecting the measuring unit with the instrument case;

Figure 4 is a perspective view similar to Figure 1, but illustrating an assembly in which the instrument case is adapted for flush mounting; and Figure 5 is a section along line 5—5 of Figure 4.

Referring to the drawings wherein like reference characters designate like parts throughout the several views, there is illustrated in Figure 1 a recording thermometer of the four-pen type, in which pens 10a, 10b, 10c and 10d are suitably mounted for movement about a common axis XX of rotation by a mounting assembly as described in United States Patent to E. H. Bristol et al., No. 1,778,702, dated October 14, 1930. The pen arm levers 11a, 11b, 11c and 11d, of known construction, move the pen arms and are connected by links 12a, 12b, 12c and 12d with the levers of the measuring element assemblies generally designated A, B, C and D.

The helical pressure springs of the element assemblies are suitably connected with the capillaries 13a, 13b, 13c and 13d which extend through openings in the cylindrical side wall of an instrument casing generally designated 15, the protective tubing 14a, 14b, 14c and 14d for the capillaries being secured to the case wall, by means to be described. The tubing is in turn connected with a responsive element or measuring bulb such as shown at 8 so that variations in the responsive element are transmitted to the measuring element. The measuring element, the capillary tubing and protective tubing and the responsive element together form a unit which hereinafter will be referred to as the responsive unit.

While a four-pen recorder is illustrated in Figure 1 it will be understood that such is by way of example only and that the number of pens and associated measuring units may be decreased or increased as desired.

It is desirable that the construction of the casing permit the assembly of the measuring element, capillary tubing, protective tubing and responsive element in a substantially permanent relationship independently of the instrument casing and the mounting of these parts in the instrument casing after such assembly. One of the advantages of such a construction is that if one of the responsive units becomes damaged or needs to be changed for any other reason while in service, the particular unit may be removed from the instrument casing without disturbing the other responsive units and be replaced or repaired as desired, all without the need of returning the instrument casing to the factory. So, too, with such an arrangement the instrument or part of the instrument may be converted from one type of service into another type in the field without the necessity of returning the entire instrument to the factory.

Referring to Figures 1, 2 and 3, there is illustrated one embodiment of the invention whereby an instrument casing or case is provided in which the responsive units may be assembled or from which they may be removed without disturbing the connections between the measuring element, the capillary and protective tubing and the responsive element. In Figures 1 and 2 the responsive units are shown inserted in the instrument casing in such manner that the casing may be wall mounted. The peripheral or cylindrical side wall of the casing is provided with a plurality of circular openings such as the small area opening 80 into which opens one end of a slot 81, the other end opening into the top opening of the case. A protective tubing 14 which protects the capillary 13 exteriorly of the casing is secured to a connector or anchoring member 82 having a threaded portion 83 of such diameter that it may pass through the opening 80, the body portion of the connector 82 being of greater diameter to provide a shoulder which may bear against the outer surface of the case wall. The connector assembly includes a nut 84 adapted to be threaded on to the threaded extension 83 of the connector from the inner wall of the case, thus to secure the connector to the case.

Assuming that it is desired to assemble a measuring unit with an instrument casing as described, nut 84 is unthreaded from the connector 82 and slid along the capillary 13 so that it is positioned relatively within the casing. With the measuring unit held generally as shown in Figure 2, the capillary is inserted through the slot 81 until the connector 82 registers with hole 80 and upon projection of the threaded portion 83 into the hole, nut 84 is threaded on the connector to secure the capillary 13 and protective tubing 14 to the side wall of the instrument case. The measuring element assembly is inserted into the casing through the open top thereof, and is secured in its proper position against the back of the casing.

To disassemble a measuring unit from the case, the reverse of the assembling operations are practiced, it being understood that a unit or portions thereof may be removed from the casing without disturbing the operation of other units operatively assembled therewith, and without requiring that the capillary be disconnected from the measuring element assembly as was heretofore necessary according to known practices.

After assembly of the measuring unit with the case as described, slot 81 is adapted to be closed by a key 85 which may be slightly tapered in section whereby it is frictionally held within the slot yet is capable of being knocked out when it is desired to disassemble a measuring unit from the case.

While four connections are illustrated by way of example in Figure 1, it will be understood that in certain instruments a lesser number of pens will be required. In this instance, connections are made as described between the casing and the measuring units in required number for a particular installation, and the unused connecting holes 80 and slots 81 are plugged, the holes 80 being plugged by a disc which can be knocked out when desired, and the slots 81 being plugged by keys 85 as described. If it is desired to add a pen or pens to the instrument as, for example, when the instrument is converted from one type of service to another, the disc and key plugs are knocked out and the added measuring units are assembled with the casing in the manner described.

The back of the casing as illustrated in Figure 1 is so constructed that the capillary tubing may enter through the back rather than through the side wall, as is necessary when the casing is flush mounted and as shown in Figure 4, thus to standardize the casing for both surface and flush type of mounting. Referring to Figures 1 and 4, the back of the casing is provided with a circular hand hole 90 of substantial area adapted to be closed by a hand hole cover 91. By reference to Figure 5 the cover has a marginal flange 92 seating in an outer circular recess surrounding the hand hole 90, whereby the cover is prevented from moving into the casing. To removably secure the cover to the back of the casing, washer headed securing screws 93 are provided on the cover, the heads of which extend over the peripheral edges of the cover and hand hole 90. Hence, unintentional removal of the cover following its mounting in covering relation with reference to the hand hole is prevented.

Disposed in spaced relation around the hand hole opening is a plurality of circular openings 95 illustrated by way of example as four in number. These holes 95 communicate with hand hole 90 through connecting slots 96. When the instrument is to be surface mounted, with connections made through the side wall of the casing as illustrated in Figure 1, the connector holes 95 and slots 96 are or may be plugged by means of disc plugs 97 and slot keys 98. However, when the instrument casing is to be flush mounted, as illustrated in Figure 4, connector holes 80 and the related slots 81 are plugged, plugs 97 and keys 98 knocked out, and connections between the measuring units and the casing are thereupon made through the back of the casing as illustrated in Figure 4.

In assembling measuring units with a casing to be flush mounted, the clock motor (not shown) if mounted in the casing is removed through the front cover opening. Thereupon the measuring element assembly is inserted into the casing through the hand hole opening 90 for securement to the casing back as described in connection with the Figure 1 construction and the capillary moved through slot 96 until its connector may be positioned in a hole 95 and secured by a nut 100. To disassemble from or replace a measuring unit in the field, it is necessary to remove the clock motor to provide access to the cover plate 91 which is normally located in covering relation with reference to the hand hole 90. The cover is then removed, with the hand hole thereupon providing sufficient opening for passage of the measuring element therethrough.

As shown in Figure 4, securing nuts 100 which correspond in function to the securing nuts 84, shown in Figures 2 and 3, may secure against the back face of the instrument number plates 101 on which may be inscribed data identifying the particular measuring unit. While not illustrated in Figure 1, nuts 84 may similarly secure against the inner face of the casing side wall identifying tags similar to tags 101. The provision of identifying tags associated with each unit provides an extremely simple means by which the manufacturer upon order can supply a new measuring unit of the same characteristics as those of a damaged unit, so that replacement can be effected in the field.

As many changes could be made in carrying out the above constructions without departing from the scope of the invention, it is intended that all matter contained in the above description or shown in the accompanying drawings shall be interpreted as illustrative and not in a limiting sense.

I claim:

1. In an instrument of the character described, in combination, an instrument casing having a side wall whose forward edge defines a front opening, and a back wall, the side wall having therein a small area opening and a slot extending from said opening to the forward edge of the wall, the back wall having a hand opening of relatively large area, a hole of small area, and a slot extending between said hand opening and hole, a responsive unit including a measuring element and a tubing connected thereto, the arrangement being such that the measuring element is selectively insertable through and removable from the casing through the front opening, with the tubing movable therewith through the side wall slot to and from a position in the side wall hole, or is insertable through and removable from the casing through the hand opening in the back wall, with the tubing movable therewith to and from a position in the back wall hole of small area, and means for closing the unselected small area hole and its related slot.

2. In a recording instrument, in combination, a responsive unit comprising a measuring element, a responsive element, a capillary tubing connecting said measuring and responsive elements and a protective tubing over said capillary tubing, all inseparably connected; an instrument casing having a side wall whose front edge defines a front opening, and a back wall, the side walls having therein a plurality of small area openings and slots extending from said openings to the front edge of the wall, the back wall having a hand opening of relatively large area and a plurality of holes of small area and slots extending between said holes and said hand opening; said measuring element being selectively insertable through and removable from the casing through the front opening with the capillary tubing movable therewith through a side wall slot to and from a position in the respective side wall hole, or insertable through and removable from the casing through the hand opening in the back wall with the capillary tubing movable therewith to and from a position in one of the back wall holes of small area; means for securing and sealing said protective tubing with respect to the small area hole through which the capillary tubing passes, means for sealing the related slot, means for sealing the unselected small area holes and related slots, and means for normally closing the back wall hand opening.

3. An instrument casing adapted for either surface or flush mounting, the casing having a side wall and a back wall, the front edge of the side wall defining a front opening, and the side wall having therein a small area opening and a slot extending between the front and small area openings, the back wall having therein a large area opening, a small area opening, and a slot extending between said openings.

4. An instrument casing assembly including a wall having edge portions defining a large area opening, said wall also having a small area opening and a slot extending between and connecting said openings, an anchoring device removably secured in said small area opening and including a nipple held against lateral displacement from said small area opening by inner edge portions thereof, and a tube extending from said nipple for connection with an instrument in said casing and adapted to pass through said slot when said nipple is inserted and removed from the small area opening.

5. In an instrument of the character described, in combination, an instrument casing, a measuring element releasably secured in the casing, a capillary tube connected with said element and passing thence through the casing to a point exterior thereof, a protector tube covering portions of said capillary tube outside the casing, said casing having a large area opening through which said element may be inserted and removed from the casing, a smaller area opening, and a slot connecting said two openings to provide a passage through which the capillary tube is moved with the measuring element as the latter is inserted into or removed from the casing, and an anchoring device at one end of said protector tube having a portion of greater diameter than the width of said slot and releasably engaging with said smaller opening to secure said protector tube to the casing and to permit its ready attachment and removal along with insertion and removal of the measuring element and the capillary tube.

6. An instrument casing having a wall with edge portions defining a large area opening and having a small area opening and a slot narrower than said small area opening to provide a relatively constricted passageway connecting said large and said small area openings, a connector nipple removably secured in said small area opening, a removable key slidably engaging said slot and with an inner end bearing against said nipple when the latter is positioned in said small area opening, and a cover cooperating when closed with the said edge portions of the large area opening and overlying an outer end portion of said slot and said removable key therein.

CLAUDE D. YOUNG.